July 14, 1964 A. J. MARINO ETAL 3,140,520
SNAP-ON DEVICE FOR ATTACHING LEADER LINES
TO FISH LINES AND THE LIKE
Filed May 31, 1962
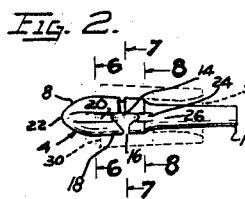
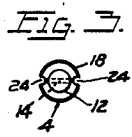
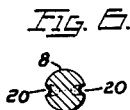
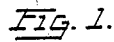
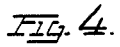
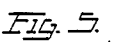
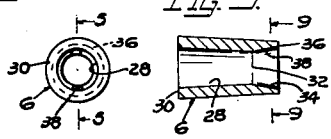
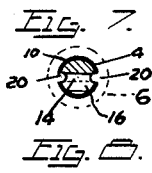
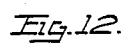
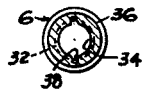
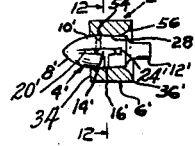
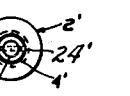
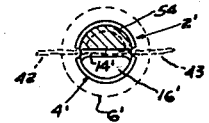
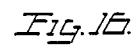
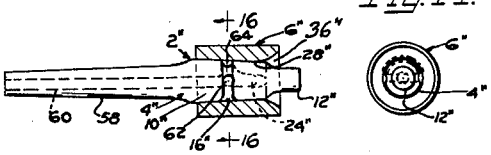
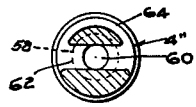
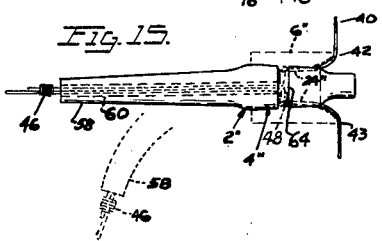
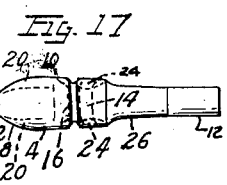
INVENTORS

United States Patent Office 3,140,520
Patented July 14, 1964

3,140,520
SNAP-ON DEVICE FOR ATTACHING LEADER LINES TO FISH LINES AND THE LIKE
Anthony J. Marino, 4105 Central Ave., San Diego 5, Calif.; Anthony M. Belfiore, 559 Encinitas Ave., San Diego 14, Calif.; and Adolph F. Graf von Soden, 1827 Titus St., San Diego 1, Calif.
Filed May 31, 1962, Ser. No. 198,780
1 Claim. (Cl. 24—126)

The invention relates to a lead line snap-on device or apparatus adapted for attaching same to and upon any part or stretched section of a supporting fish line of the type that is used in and for fishing purposes, including guide lines, mooring line or cable or the like, and more particularly relating to a leader line end snap-on connection, wherein more than two end leader lines may be connected to a supporting fish line and be secured thereon.

Manifestly an object of the invention is to provide a suitable snap-on and line binding device or apparatus, said device having means for holding and for binding a leader line in place to a stretched section of a supporting fish line, for extending same therefrom and for holding same thereon without sliding or slipping, also, said device having means for binding a loop-shaped end of a leader line for directing and for holding same in an outwardly extended position, thereby preventing said extended leader line from twisting and wrapping around said extended fish line.

Accordingly an object of the invention is to provide a lead line snap-on and binding device or apparatus, having means for holding a leader line loop end in place and in an extended position, and also, said device having means for urging one section thereof into a locking and a fish line binding position when the fish line pull or stretch is imposed upon said snap-on device and when same is mounted on said supporting fish line or applied thereto.

A further object of the invention is to provide said leader line snap-on device with suitable means adapted for readily attaching a looped end of said leader line into position and having means for holding same in place without slipping upon the supporting fish line and also without forming a kink therein or knotting same.

Another object of the invention is to provide said snap-on device having a plug and an outer sleeve, said plug having a suitable arch of which the outer surface thereof is provided with a recessed or grooved half annular section adapted for holding and for retaining therein the fish line section or a portion thereof when deposited therein, and also, said plug having a suitable cylinder bar or plunger section extending therefrom for securing an instantaneous release and dismantling of same from said outer sleeve associated therewith and for readily disconnecting the fish line attached thereto.

A further object of the invention is to provide said leader line snap-on device of such structure whereby the method and the operation of processing same may be greatly facilitated.

The invention also has for its objects to provide such means that are positive in operation, convenient in use individually and collectively upon a supporting line, easily installed in a working position and easily disconnected therefrom, economical in manufacture, relatively simple, and of general superiority and serviceability.

The invention also compirses novel details of construction and novel combinations and arrangements of parts, which will more fully appear in the course of the following description.

Reference is now had to the accompanying drawings in which the similar reference characters denote the same parts.

In the drawings:

FIG. 1 shows a front elevational view of the snap-on device, showing same attached to a supporting fish line and also showing the leader line loop mounted therein with the fish hook disposed at the end thereof.

FIG. 2 shows a slightly enlarged front elevational view of the snap-on plug member and showing the outer sleeve in dotted lines.

FIG. 3 shows the rear end view of said plug member, taken from the right of FIG. 2.

FIG. 4 shows the front end elevational view of the outer sleeve of said snap-on device, taken from the left of FIG. 5.

FIG. 5 shows a vertically sectional view of the outer sleeve taken in the direction of the arrows 5—5 of FIG. 4.

FIG. 6 shows a vertically sectional view of the plug member, taken on line 6—6 of FIG. 2.

FIG. 7 shows another vertically sectional view of the plug member, taken on the lines 7—7 of FIG. 2.

FIG. 8 shows another vertically sectional view of the plug member, taken on the lines 8—8 of FIG. 2.

FIG. 9 shows a vertically sectional view of the outer sleeve member, taken on the lines 9—9 of FIG. 5.

FIG. 10 shows a partly sectional and partly elevational view of the snap-on device, showing same in a modified form.

FIG. 11 shows the rear end elevational view of the snap-on device taken from the right of FIG. 10.

FIG. 12 shows a vertically sectional view of the snap-on device, taken on lines 12—12 of FIG. 10, showing the fish line bight in place.

FIG. 13 shows a partly sectional and partly elevational view of the snap-on device, showing same in another modified form.

FIG. 14, shows a rear end elevational view of the snap-on device, taken from the right of FIG. 13.

FIG. 15 shows an elevational view of the plug member taken from the top of FIG. 13.

FIG. 16 shows a vertically sectional view of the snap-on device, taken on lines 16—16 of FIG. 13, showing the half annular groove in said plug member.

FIG. 17 shows an elevational view of the plug member of the snap-on device, taken from the top of FIG. 2.

Describing the invention more in detail, in its broader aspects, said invention comprises a snap-on device or apparatus generally designated by numeral 2, consisting of a plug 4 and an outer sleeve 6, which are fitted one into the other, as shown.

Said plug 4, in preferred form, is an elongated member, consisting of a front point 8 having a gradually enlarging body and forming into an arcuated oval shape which extends rearwardly and blends into a shank or barrel section 10, the rear end of which terminates with a mid-section and a cylindrical bar 12.

Said barrel section 10 is provided with an elongated and centrally positioned cross opening 14, having a suitably formed communicating passage 16 which extends to and terminates at the outer surface thereof, said outer surface 18 of said barrel is suitably tapered the entire length thereof, the purpose of which will be presently described.

The outer surface section adjacent to said frontwardly disposed edges of said centrally positioned cross opening 14 and formed by said passage 16 extending through said barrel section 10, each is provided with a semi-circular and frontwardly extending groove 20 and each groove upon said barrel surface having its frontwardly extending end thereof blended with the contour of said front point 8 and each terminating in close proximity to the tip 22 as shown, also, each of said rear edges on said surface section of said cross opening 14 so formed by said passage 16 is provided with a groove 24 which extends rearwardly and terminates at the mid-section 26 adjacent to the junction of said barrel section 10 which blends into said cylindrical bar 12.

Said grooves 20 and 24 are provided with round and smooth surfaces for preventing chafing or marring of the fish line and leader loop surfaces when in use.

The outer sleeve 6 of said snap-on device comprises a longitudinally tubular structure, having a suitably tapered bore 28 which is of the precise angle or pitch that may be used in said barrel section 10 of said plug 4, having the larger taper bore disposed at the front end 30 while the smaller and diametrically diminishing taper bore terminating at a demarcation line or point 32 which is approximately three fourths of the sleeve length.

A suitably flared-out surface 34 extends from said line or point 32 blending outwardly from said diminished taper bore 28 which terminates at the rear end 36, the contour of which may be of any desirable shape or configuration, or, the same may be slightly arcuate as shown in FIGS. 10 and 13.

If so desired, said flared out surface 34 may be provided with a pair or a plurality of grooves 38 adapted for directing the fish line 40 and its extending line loop end into diametrically opposite positions, as shown in FIG. 1, and thus preventing said lines from becoming entangled when fishing.

When in use, as shown in FIG. 1, said line 40 which in the instant case a fish line is employed, a bight is formed out of a section of said fish line and the extended looped end is first threaded through the rear end 36 of said tapered bore 28 provided in said outer sleeve 6, then said looped end is placed within said cross opening 14 of said plug 4, directing the extended line sections 42 and 43 rearwardly and into said grooves 24 toward said midsection 26 of said cylindrical bar 12.

The upper section 42 of said fish line is directed to the fish line rod and reel (not shown), while the lower section 43 of said fish line is directed to and terminates at a suitable sinker 44.

Then for securing a leader line 46 in position, a leader line loop 48 is placed within said cross opening 14 and the loop ends are then directed into said front grooves 20 extending into said front point 8 of said plug 4, said leader line 46 having a fish hook 50 disposed at the end thereof, as shown.

When said looped section of said fish line 40 is in place, and the loop end 48 of said leader line is in position, then said outer sleeve 6 is forced over said tapered barrel 10 of said plug 4, thereby holding and binding said leader line loop in place including the bight of said fish line section, the binding of said loops being supported by the pull that may be imposed upon by the pressure of the line section 42 against the rear end 36 in said outer sleeve 6 by urging its tapered bore 28 over said tapered barrel section 10 of said plug 4.

In this manner, several leader lines 46 may be attached at suitable intervals or spaces to a fish line 42, without forming auxiliary loops or tying knotted looped line connections in same, and also eliminating the conventional cutting of said fish line.

Also, when said snap-on device 2 is in position upon said fish line then said leader line 46 will be supported and held in an outwardly extended position, thereby preventing said hook 50 from being wrapped or twisted around said fish line extended end 43 and also preventing the tangling of said fish line ends when in use.

Obviously it may be noted, that said snap-on device 2 may be made out of suitable metal or plastic, or a combination thereof, as in practice may be found to be most desirable and practicable.

As shown in FIGS. 10, 11 and 12, said snap-on device 2′ is disclosed in a modified form, wherein said plug 4′ is provided with a tapered barrel section 10′ adapted for supporting thereon the internally tapered bore 28′ of said outer sleeve 6′.

Said plug 4′ is provided with an elongated cross opening 14′ and the communicating passage 16′, having in addition an outer semi-circular groove 54 disposed outwardly at the opposite side of said passage 16′ and extending over the upper half section of said barrel 10′ which is adapted for receiving and supporting therein the eye section of the line bight, thus allowing the extended line end sections 42 and 43 (as shown in FIGS. 1 and 12) to pass toward the rearward end of said plug 4′ when placed in and following the grooves 24′, and also for allowing said line end sections to bear against the arcuate surface 56 disposed at the rear end 36′ of said outer sleeve 6′.

The loop of said leader line 46 is then placed within said cross opening 14′ in the same manner as shown in FIG. 1, and the loop ends are directed to the front point 8′ for holding said leader line in an outwardly extended position.

When in use, the eye of the bight of said fish line being disposed in said circular groove 54 and also retained in said front grooves 20′ of said plug 4′ allowing the outer sleeve 6′ to be placed easily thereover, which will cause said fish line to be held firmly in place and position without slipping, and when said eye of the fish line bight becomes pressed into position of said groove 54 by means of said tapered bore 28′ of said outer sleeve 6′ and urged into place by the pull imposed thereon by means of said line section 42 then the slipping of said line 40 is prevented.

Also, if so desired, and before applying said outer sleeve 6′ over said plug 4′, said bight and loop of said fish line 40 may be placed within said cross opening 14′ having the eye of the bight placed in said groove 54, as shown in FIG. 12, then the extending loop ends 42 and 43 are directed into opposite sides to be held in the respective grooves 20, thereby securing a complete loop of the fish line section extending around the upper grooved section of said plug 4′ so that the slipping of said fish line 40 may be entirely eliminated when said outer sleeve 6′ is in place and when a pull is imposed upon said leader line 46 that is held by said plug 4′.

In FIGS. 13, 14 and 15, said snap-on device 2″ is shown in another modified form, wherein said plug 4″ is provided with a frontwardly extending tubular and flexible extension 58 (FIG. 15), said extension having a longitudinal passage 60 terminating at the cross aperture 62, the upper section of which is provided with a semi-circular and arcuate groove 64 connecting each side end of said aperture, as shown in FIG. 16.

Said plug 4″ is provided with said tapered barrel 10″ for securing thereover said outer sleeve 6″ and also, having a pair of grooves 24″ extending rearwardly from said aperture 62 as shown.

When in use, a looped end 48 of said leader line 46 is threaded through said longitudinal passage 60 directed through the passage 16″ and over the bar 12″ for allowing same to rest within said semi-circular and arcuate groove 64.

Of the fish line 40 the eye of the bight is then threaded through said sleeve 6″ and then through said connecting passage 16″ into said cross aperture 62, allowing the loop extending ends to rest within the respective rearwardly disposed grooves 24″ and allowing the bight of said fish line section to rest in said semi-circular and arcuate groove 64, whereupon said outer sleeve 6″ is pressed into position as shown.

Obviously, it may be noted, that the eye of bight of said fish line section may be formed and then be laid within said arcuate groove 64 allowing the loop ends 42 and 43 to be directed oppositely to each other in linear direction and causing same to rest within the respective grooves 24″ in a manner hereinbefore mentioned, so that the pull on the fish line 40 and the upper line section 42 will cause said outer sleeve 6″ to be urged into a tight position over said plug barrel 10″, thereby holding said fish line 40 including said leader line 46 in place and particularly when a pull or pressure is imposed or applied upon the leader line 46.

For disconnecting said plug 4 from its mounted position within said tapered bore 28 of said outer sleeve 6, said extending bar 12 is pressed inwardly into said sleeve 6 which dislodges said plug 4 from said sleeve, allowing said fish line 40 and said leader line 46 to be removed and disconnected.

It may also be noted, that said snap-on device 2 may be used for mounting and securing the guide lines, guy rods, wires and ropes, etc., for securing a suitable mooring or, for providing a plurality of spider-like line extensions to secure floating objects and for anchoring same, without looping and knotting the leader line in its midsection, and that said snap-on device 2 may be used for retaining an auxiliary line in place and position and be easily and quickly removed from its mounting when required and in emergency, Said outer sleeve 6, as shown in FIGS. 5, 10 and 13, when in a process of manufacture, same may be made automatically out of metal or plastic, and be made in any suitable configuration that will meet the requirement in use and practice.

Said plug 4, as shown in FIGS. 2, 10 and 13, may be made out of suitable metal or plastic and be molded in such a manner so that the opening 14 and the passage 16, including the grooves 20, 24, 54 and 64 may be easily impressed and the core removed after molding.

While this invention is described with great particularity it will be clear that the same may be modified throughout a wide range.

We, accordingly, do not propose that this invention be limited to the exact details of construction herein shown on the drawings and described in the specification, and that reservations of the rights in practice are retained, to the end that the necessary changes and modifications may be made therein, which may come within the scope of the appended claims.

We claim as our invention:

In a snap-on device of the class described comprising an elongated plug means having a tapered barrel body, a cross opening passing through said barrel body and extending longitudinally along said body, said cross opening having a communicating passage extending toward and terminating at the outer surface of said barrel body, a semi-circular and arcuate groove disposed transversely across said barrel body and approximately opposite to said communicating passage for attaching a bight of a fish line therearound and for allowing the fish line extending sections to pass rearwardly along the barrel body, a leader line loop disposed in said cross opening and extending frontwardly along said barrel body, an outer sleeve means for engaging said tapered barrel body and thereby fastening and holding said bight of the fish line including said loop of said leader line in place, said outer sleeve means having a flared out and arcuate rear end, there being a pair of grooves in said arcuate rear end of said sleeve means and disposed oppositely to each other for engaging and for guiding said extending sections of said fish line, and a set of grooves extending longitudinally along the outer surface of said barrel body and disposed diametrically opposite to each other in pairs, of which one pair extends frontwardly along said barrel body from said cross opening and the rearwardly extending pair of grooves leading from said cross opening and along the mid-section of said barrel body for guiding frontwardly said extending loop ends of said leader line and also for guiding rearwardly said extending line sections of said bight of the fish line and thereby holding same in opposite positions when in use.

References Cited in the file of this patent

UNITED STATES PATENTS

| | | |
|---|---|---|
| 406,516 | Armstrong | July 9, 1889 |
| 1,462,406 | Zajic | July 17, 1923 |
| 2,760,295 | Bond | Aug. 28, 1956 |
| 3,023,535 | Holka et al. | Mar. 6, 1962 |
| 3,041,695 | Ouellette | July 3, 1962 |

FOREIGN PATENTS

| | | |
|---|---|---|
| 83,850 | Norway | June 21, 1954 |